United States Patent
Nishino et al.

(10) Patent No.: US 8,496,736 B2
(45) Date of Patent: Jul. 30, 2013

(54) HYDROGEN SUPPLY DEVICE

(75) Inventors: Junya Nishino, Ube (JP); Katsumi Takahashi, Sagamihara (JP); Hiroyuki Obara, Ashigarashimo-gun (JP)

(73) Assignees: IHI Corporation (JP); Tamagawa K-12 & University (JP)

( * ) Notice: Subject to any disclaimer, the term of this patent is extended or adjusted under 35 U.S.C. 154(b) by 246 days.

(21) Appl. No.: 12/867,899

(22) PCT Filed: Feb. 18, 2009

(86) PCT No.: PCT/JP2009/052776
§ 371 (c)(1),
(2), (4) Date: Dec. 2, 2010

(87) PCT Pub. No.: WO2009/104638
PCT Pub. Date: Aug. 27, 2009

(65) Prior Publication Data
US 2011/0076203 A1    Mar. 31, 2011

(30) Foreign Application Priority Data
Feb. 19, 2008    (JP) ................ P2008-037979

(51) Int. Cl.
*B01D 53/22*    (2006.01)
(52) U.S. Cl.
USPC ............... 96/11; 95/45; 95/55; 96/4
(58) Field of Classification Search
USPC ........................ 95/45, 55; 96/4, 11
See application file for complete search history.

(56) References Cited

U.S. PATENT DOCUMENTS 1,495,681 A * 5/1924 Fauser ............ 204/258
1,721,407 A * 7/1929 Pechkranz ............ 204/254
(Continued)

FOREIGN PATENT DOCUMENTS

EP  0 718 031   6/1996
EP  1 760 811   3/2007
(Continued)

OTHER PUBLICATIONS

Machine Translation of 2004-277275, Hiroshi, Oct. 7, 2004.*
(Continued)

*Primary Examiner* — Jason M Greene
*Assistant Examiner* — Anthony Shumate
(74) *Attorney, Agent, or Firm* — Ostrolenk Faber LLP

(57) ABSTRACT

The present invention relates to a hydrogen supply device which supplies hydrogen by selectively permitting permeation of hydrogen contained in a hydrogen containing gas (G1). This device includes: a first metal layer (2) which dissociates hydrogen molecules into hydrogen ions by a catalytic reaction and has hydrogen permeability; a second metal layer (3) which creates hydrogen molecules by bonding hydrogen ions to each other using electrons and has hydrogen permeability; a hydrogen permeation layer (1) which is interposed between the first metal layer (2) and the second metal layer (3) and permits permeation of the hydrogen ions from the first metal layer (2) to the second metal layer (3) by the application of a voltage; and a voltage application (7) for applying the voltage to the hydrogen permeation layer (1) by setting the first metal layer (2) as an anode and setting the second metal layer (3) as a cathode. According to this device, even when the concentration of hydrogen is low, it is possible to dissociate hydrogen from a hydrogen containing gas, and to suppress noise during the operation of the device.

8 Claims, 5 Drawing Sheets

U.S. PATENT DOCUMENTS

| | | | | |
|---|---|---|---|---|
| 2,070,612 | A | * | 2/1937 | Niederreither ............... 429/409 |
| 4,797,185 | A | | 1/1989 | Polak et al. .................. 204/129 |
| 6,036,827 | A | * | 3/2000 | Andrews et al. ............. 204/252 |
| 6,833,207 | B2 | * | 12/2004 | Joos et al. ..................... 429/415 |
| 7,247,400 | B2 | * | 7/2007 | Oyabe et al. ................. 429/432 |
| 7,285,343 | B2 | * | 10/2007 | Kato et al. ................... 429/418 |
| 7,413,687 | B2 | * | 8/2008 | Armstrong et al. ........ 252/518.1 |
| 2001/0033959 | A1 | * | 10/2001 | Ovshinsky et al. ............. 429/40 |
| 2001/0049034 | A1 | * | 12/2001 | Hanlon .......................... 429/13 |
| 2005/0252853 | A1 | | 11/2005 | Berland et al. ........... 210/500.25 |
| 2011/0177403 | A1 | * | 7/2011 | Usami et al. ................. 429/415 |

FOREIGN PATENT DOCUMENTS

| | | |
|---|---|---|
| JP | 2001-102076 | 4/2001 |
| JP | 2004-131306 | 4/2004 |
| JP | 2004-256328 | 9/2004 |
| JP | 2004-277275 | 10/2004 |
| JP | 2004-307249 | 11/2004 |
| WO | WO 2005/077818 | 8/2005 |

OTHER PUBLICATIONS

Supplementary Search Report dated Mar. 6, 2012 issued in corresponding European Patent Application No. 09712898.7 (6 pages).
International Search Report and Written Opinion mailed Mar. 17, 2009 in corresponding PCT International Application No. PCT/JP2009/052776.

* cited by examiner

HYDROGEN SUPPLY DEVICE

CROSS-REFERENCE TO RELATED APPLICATIONS

The present application is a 35 U.S.C. §§371 national phase conversion of PCT/JP2009/052776, filed Feb. 18, 2009, which claims priority of Japanese Patent Application No. 2008-037979, filed Feb. 19, 2008, the contents of which are incorporated herein by reference. The PCT International Application was published in the Japanese language.

TECHNICAL FIELD

The present invention relates to a hydrogen supply device which supplies hydrogen by selectively permitting permeation of hydrogen contained in a hydrogen containing gas.

BACKGROUND ART

In recent years, a fuel cell using hydrogen as fuel has been proposed, and high-purity hydrogen has been required as fuel of the fuel cell. In order to acquire the high-purity hydrogen, a hydrogen supply device has been conventionally used which selectively permits permeation of hydrogen contained in a mixed gas (hydrogen containing gas) supplied to one side of the device and outputs hydrogen from the other side of the device (refer to Patent Document 1).

For example, Patent Document 1 discloses a hydrogen supply device which includes a dehydrogenation catalytic layer and a hydrogen dissociation membrane. According to the hydrogen supply device disclosed in Patent Document 1, hydrogen is supplied in such a manner that a mixed gas containing hydrogen is formed from a liquid hydrogen containing compound by the use of the dehydrogenation catalytic layer, and hydrogen contained in the mixed gas permeates the hydrogen dissociation membrane.
[Patent Document 1] JP-A-2004-131306

DISCLOSURE OF INVENTION

Technical Problem

However, in the hydrogen supply device disclosed in Patent Document 1, in order to allow the hydrogen to permeate the hydrogen dissociation membrane, the pressure of the mixed gas side needs to be relatively high, and the pressure of the hydrogen supply side needs to be relatively low. That is, in the conventional hydrogen supply device, a gradation of pressure is formed between the mixed gas side and the hydrogen supply side, and the permeation of the hydrogen is performed by the gradation of the pressure.

For this reason, in order to allow the pressure of the mixed gas side to be relatively high and to allow the hydrogen supply side to be relatively low, it is necessary to install a large device such as a pump. For this reason, the energy consumption amount of an operating part increases. Further, as the device increases in size, and noise generated from the devise also increases during the operation thereof.

In addition, when the permeation of the hydrogen is performed by the gradation of the pressure, it is difficult to dissociate the hydrogen in the case where the concentration of hydrogen contained in the hydrogen containing gas is low.

Further, a method is also proposed which selectively absorbs hydrogen from a mixed gas by using absorbent. However, even in the hydrogen supply device adopting such a method, a pump is required, and a large volume of absorbents are required. For this reason, the device increases in size, and noise increases during the operation thereof as in the case of forming the gradation of the pressure. In addition, since the hydrogen absorbing efficiency of the absorbent is reduced with time, the absorbent needs to be exchanged periodically.

The present invention is contrived in consideration of the above-described problems, and an object of the present invention is to provide a hydrogen supply device capable of dissociating hydrogen from a hydrogen containing gas even when the concentration of hydrogen is low and to suppress noise during the operation of the device.

Technical Solution

In order to achieve the above-described object, the present invention provides a hydrogen supply device which supplies hydrogen by selectively permitting permeation of hydrogen contained in a hydrogen containing gas, including: a first metal layer which dissociates hydrogen molecules into hydrogen ions by a catalytic reaction and has hydrogen permeability; a second metal layer which creates hydrogen molecules by bonding hydrogen ions to each other using electrons and has hydrogen permeability; a hydrogen permeation layer which is interposed between the first and second metal layers and permits permeation of the hydrogen ions from the first metal layer to the second metal layer by the application of a voltage; and a voltage application means for applying the voltage to the hydrogen permeation layer by setting the first metal layer as an anode and setting the second metal layer as a cathode.

According to the present invention, since the voltage application portion applies a voltage to the hydrogen permeation layer so that the first metal layer is an anode and the second metal layer is a cathode, hydrogen contained in a hydrogen containing gas is dissociated into hydrogen ions, and selectively permeates the hydrogen permeation layer.

That is, according to the present invention, hydrogen molecules are selectively changed into hydrogen ions by the first metal layer, and a gradation of a voltage is formed between a hydrogen containing gas side and a hydrogen supply side, thereby selectively permitting the permeation of the hydrogen ions by the gradation of the voltage.

In addition, the present invention may further include an electron supply amount control portion for controlling an amount of the electrons supplied to the second metal layer.

The present invention may further include a gas diffusion portion for diffusing a hydrogen containing gas while being disposed on the opposite surface of the surface contacting with the hydrogen permeation layer of the first metal layer.

The present invention may further include a gas diffusion portion for diffusion of hydrogen gas while being disposed on the opposite surface of the surface contacting with the hydrogen permeation layer of the second metal layer.

Moreover, in the present invention, the gas diffusion portion may have any one of a structure having a groove portion, a structure formed by sintered metal, and a structure formed by a grating-shaped metal plate or a lamination thereof.

The present invention may further include a heating portion for heating a space where the hydrogen permeation layer is exposed.

The present invention may further include a plurality of units including the first metal layer, the second metal layer, and the hydrogen permeation layer.

Moreover, in the present invention, the plurality of unitary units may be arranged in the lamination direction of the first metal layer, the second metal layer, and the hydrogen permeation layer.

Advantageous Effects

According to the present invention, a gradation of a voltage is formed between the hydrogen containing gas side and the hydrogen supply side, and the permeation of hydrogen is performed by the gradation of the voltage. For this reason, a gradation of a pressure is not required between the hydrogen containing gas side and the hydrogen supply side, and a large device such as a pump does not need to be installed.

Therefore, according to the hydrogen supply device of the present invention, it is possible to dissociate hydrogen from a hydrogen containing gas even when the concentration of hydrogen is low, and to suppress noise during the operation of the device.

EXPLANATION OF REFERENCE

Figure 1:
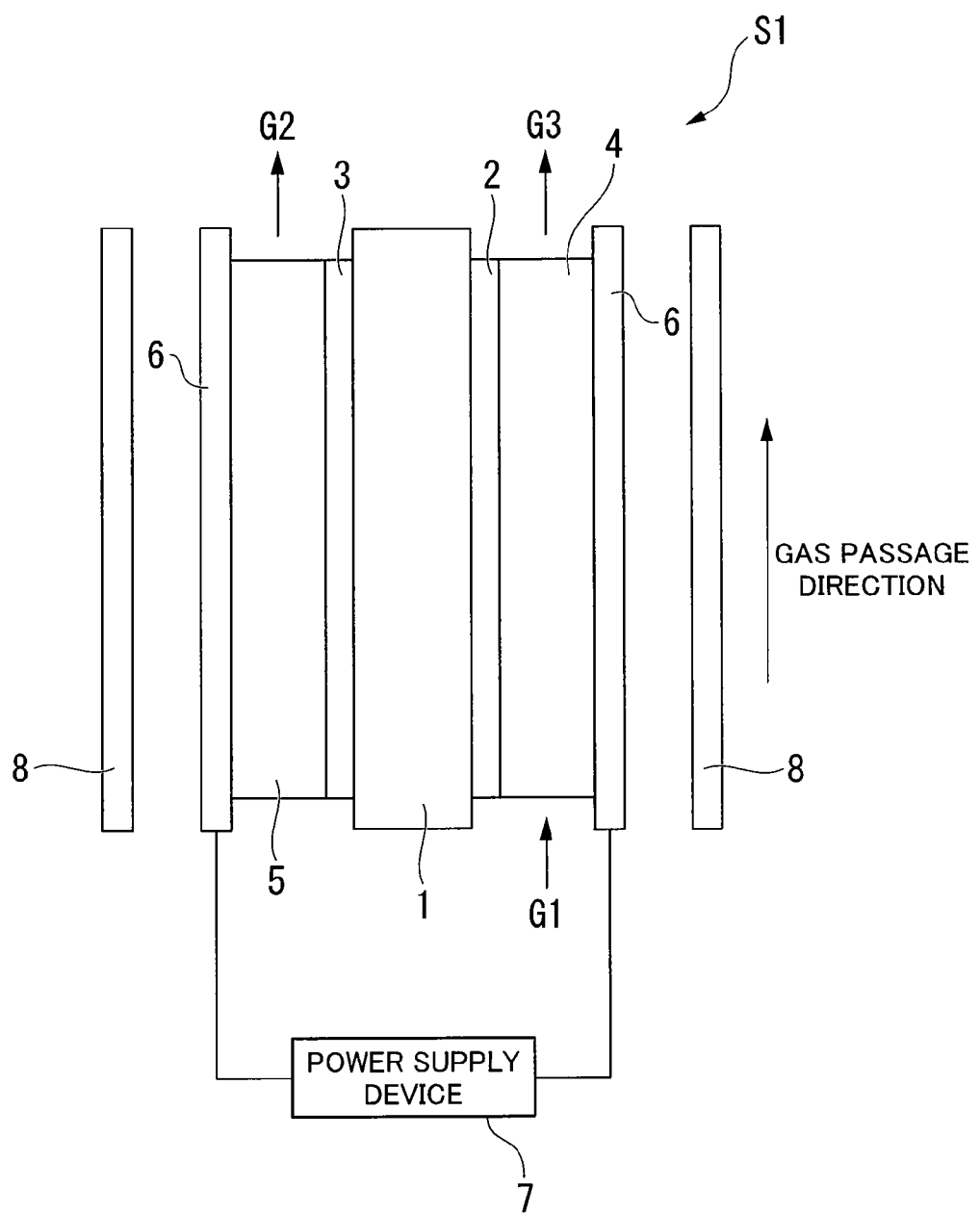
FIG. 1 is a schematic diagram showing a schematic configuration of a hydrogen supply device according to a first embodiment of the present invention.

S1, S2: HYDROGEN SUPPLY DEVICE
1: CATION EXCHANGE MEMBRANE (HYDROGEN PERMEATION LAYER)
2: HYDROGEN DISSOCIATION MEMBRANE (FIRST METAL LAYER, ANODE)
3: HYDROGEN BONDING LAYER (SECOND METAL LAYER, CATHODE)
4: FIRST CONDUCTIVE GAS DIFFUSION STRUCTURE (GAS DIFFUSION PORTION)
5: SECOND CONDUCTIVE GAS DIFFUSION STRUCTURE (GAS DIFFUSION PORTION)
6: INTERCONNECTION LAYER
7: POWER SUPPLY DEVICE (VOLTAGE APPLICATION PORTION, ELECTRON SUPPLY AMOUNT CONTROL PORTION)
8: HEATER (HEATING PORTION)

BEST MODE FOR CARRYING OUT THE INVENTION

Hereinafter, an embodiment of a hydrogen supply device according to the present invention will be described with reference to the drawings. In addition, in the drawings, the scales of the members are appropriately changed in order to make the size of the members recognizable.

First Embodiment

FIG. 1 is a schematic diagram showing a schematic configuration of a hydrogen supply device S1 of the embodiment.

As shown in the drawing, the hydrogen supply device S1 of the embodiment includes a cation exchange membrane 1 (a hydrogen permeation layer), a hydrogen dissociation layer 2 (a first metal layer and an anode), a hydrogen bonding layer 3 (a second metal layer and a cathode), a first conductive gas diffusion structure 4 (a gas diffusion portion), a second conductive gas diffusion structure 5 (a gas diffusion portion), an interconnection layer 6, a power supply device 7 (a voltage application portion and an electron supply amount control portion), and a heater 8 (a heating portion).

The cation exchange membrane 1 (more specifically, a solid polymer type cation exchange membrane) is formed in a sheet shape. In addition, the hydrogen dissociation layer 2 is bonded to the anode-side surface of the cation exchange membrane 1, and the hydrogen bonding layer 3 is bonded to the other cathode-side surface of the cation exchange membrane 1, thereby sandwiching the cation exchange membrane by the hydrogen dissociation layer 2 and the hydrogen bonding layer 3.

In the cation exchange membrane 1, the hydrogen dissociation layer 2 side is relatively set to a high potential (anode), and the hydrogen bonding layer 3 side is relatively set to a low potential (cathode), thereby permeating hydrogen ions from the hydrogen dissociation layer 2 (anode side) to the hydrogen bonding layer 3 (cathode side). That is, the cation exchange membrane 1 permits permeation of hydrogen ions by the gradation of the voltage (potential).

The cation exchange membrane 1 may be formed by any material if the material permits the permeation of hydrogen ions, for example, by the gradation of a voltage (potential), and may be formed by, for example, a material having a phosphoric group ($PO_4$) or a sulfonic group ($SO_3H$) of a strong acid group.

The hydrogen dissociation layer 2 is formed to have a metal structure function having a catalytic reaction of dissociating hydrogen molecules into hydrogen ions in the metal layer bonded to a surface of one side of the cation exchange membrane 1, and having hydrogen permeability. By the configuration of the metal material, the hydrogen dissociation layer 2 is formed as a layer which dissociates hydrogen molecules into hydrogen ions by a catalytic reaction, and has hydrogen permeability.

The hydrogen dissociation layer 2 may be formed by, for example, metal material of one or more of platinum (Pt), ruthenium (Ru), iron (Fe), cobalt (Co), titanium (Ti), palladium (Pd), nickel (Ni), potassium (K), magnesium (Mg), silicon (Si), and aluminum (Al), or may be formed by directly using oxide particles or the like of the metal materials. In addition, the hydrogen dissociation layer may be formed by using the mixture of carbon particles and the metal materials. In addition, the hydrogen dissociation layer may be formed by applying the metal materials onto the surfaces of the carbon particles. Further, as the metal materials, particularly, a metal material containing platinum (Pt) or ruthenium (Ru) may be very appropriately used.

The hydrogen bonding layer 3 is formed by a metal structure function bonding hydrogen ions to each other using electrons in the metal layer bonded to the cathode-side surface of the cation exchange membrane 1, and having hydrogen permeability. By the configuration of the metal material, the hydrogen bonding layer 3 is formed as a layer which bonds hydrogen ions to each other using electrons, and has hydrogen permeability.

As in the hydrogen dissociation layer 2, the hydrogen bonding layer 3 may be formed by, for example, metal material of one or more of platinum (Pt), ruthenium (Ru), iron (Fe), cobalt (Co), titanium (Ti), palladium (Pd), nickel (Ni), potassium (K), magnesium (Mg), silicon (Si), and aluminum (Al), or may be formed by directly using oxide particles or the like of the metal materials. In addition, the hydrogen bonding layer may be formed by using the mixture of carbon particles and the metal materials. In addition, the hydrogen bonding layer may be formed by applying the metal materials onto the surfaces of the carbon particles. Further, as the metal materials, particularly, a metal material containing platinum (Pt) or ruthenium (Ru) may be very appropriately used.

That is, the hydrogen dissociation layer 2 and the hydrogen bonding layer 3 may be formed by the same metal material in some cases.

The first conductive gas diffusion structure 4 is contacted and bonded to the entire surface opposite of the surface contacting with the cation exchange membrane 1 of the hydrogen dissociation layer 2. In addition, herein, the contact with the entire surface means uniform contact with the entire surface in a dispersed state instead of contact with all positions of the entire surface.

The first conductive gas diffusion structure 4 is formed by a material having higher conductivity than that of the hydrogen dissociation layer 2. The entire hydrogen dissociation layer 2 can be electrified via the first conductive gas diffusion structure 4.

In addition, a gas is allowed to flow in the first conductive gas diffusion structure 4 in a direction (a direction (hereinafter, referred to as a gas passage direction) in which the first conductive gas diffusion structure 4 is disposed in FIG. 1) perpendicular to the direction of the hydrogen dissociation layer 2. Further, the first conductive gas diffusion structure 4 is formed so that the passing gas is dispersed and uniformly contacts with an entire surface of one side of the hydrogen dissociation layer 2.

Figure 2A:
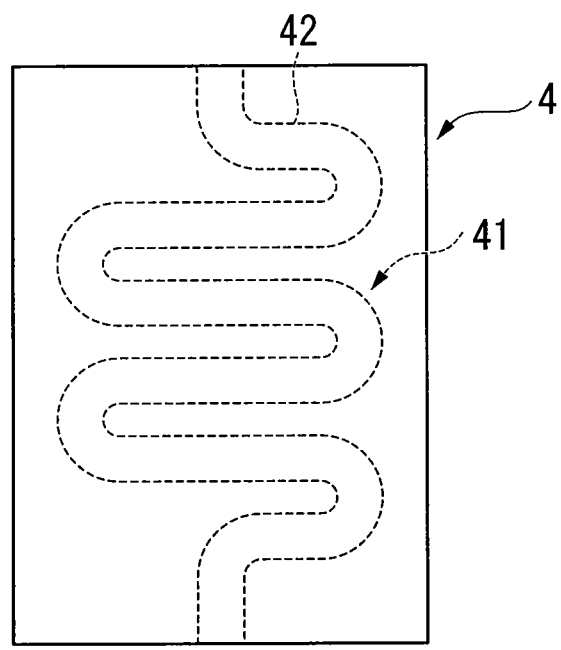
FIG. 2A is a schematic diagram illustrating a configuration of a first conductive gas diffusion structure included in the hydrogen supply device according to the first embodiment of the present invention.

Specifically, as shown in FIG. 2A, the first conductive gas diffusion structure 4 is formed as a metal block 41, an opening end is formed in each of one opening end and the other opening end of the block 41 in the gas passage direction, and a meandering channel 42 is formed in an entire surface of one side of the hydrogen dissociation layer 2, thereby permitting the permeation of the gas in the gas passage direction of the first conductive gas diffusion structure 4, and the dispersed contact of the gas with the entire surface of one side of the hydrogen dissociation layer 2.

Figure 2B:
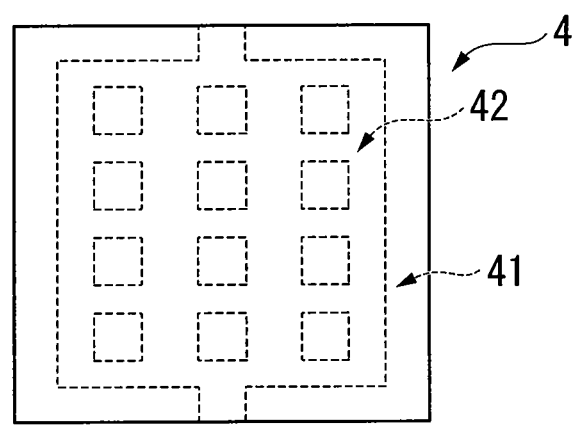
FIG. 2B is a schematic diagram illustrating another configuration of the first conductive gas diffusion structure included in the hydrogen supply device according to the first embodiment of the present invention.

In addition, the channel 42 is not limited to the one configuration shown in FIG. 2A, but may be branched into multiple parts in the course thereof. In addition, the channel 42 may be disposed in a grid shape as shown in FIG. 2B.

Figure 3:
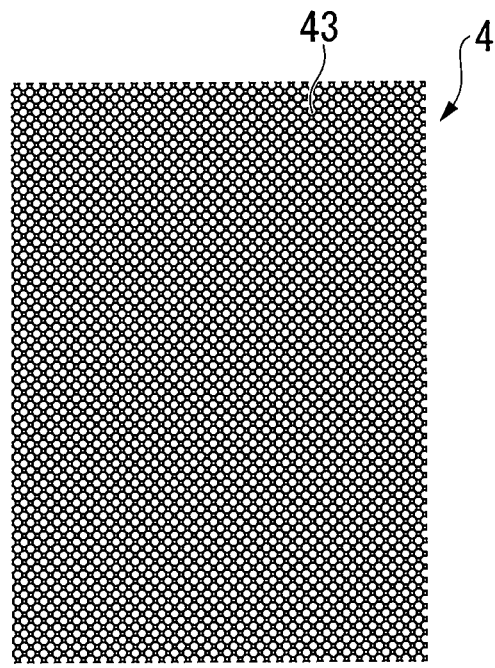
FIG. 3 is a schematic diagram illustrating a configuration of the first conductive gas diffusion structure included in the hydrogen supply device according to the first embodiment of the present invention.

Further, when the first conductive gas diffusion structure 4 is formed as a powdered layer 43 formed by compressing powders of a conductive material as shown in FIG. 3, the gas is diffused in the powdered layer 43. For this reason, it is possible to form the first conductive gas diffusion structure 4 so that the permeation of the gas is permitted in the gas passage direction, and the uniform contact of the gas with the entire surface of one side of the hydrogen dissociation layer 2 in a dispersed state is permitted.

Figure 4:
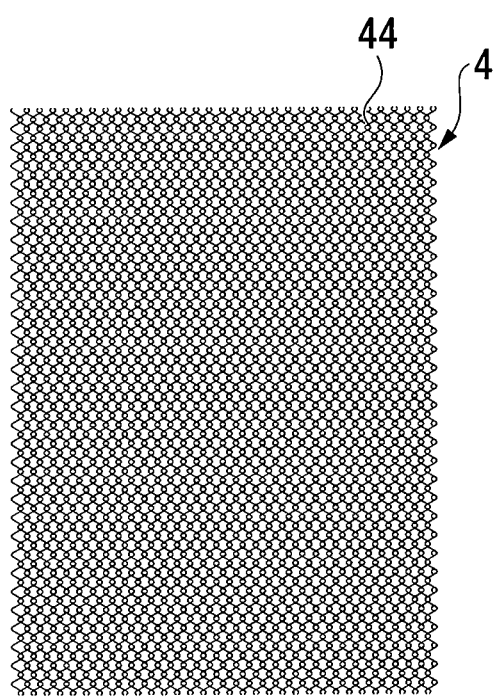
FIG. 4 is a schematic diagram illustrating a configuration of the first conductive gas diffusion structure included in the hydrogen supply device according to the first embodiment of the present invention.

Furthermore, when the first conductive gas diffusion structure 4 is formed as a grating-shaped structure 44 formed by a conductive material as shown in FIG. 4, the gas is diffused in the grating-shaped structure 44. For this reason, it is possible to form the first conductive gas diffusion structure 4 so that the permeation of the gas is permitted in the gas passage direction, and the uniform contact of the gas with the entire surface of one side the hydrogen dissociation layer 2 in a dispersed state is permitted.

The first conductive gas diffusion structure 4 may be formed by, for example, graphite.

Returning to FIG. 1, the second conductive gas diffusion structure 5 is contacted and bonded to the entire surface opposite of the surface contacting with the cation exchange membrane 1 of the hydrogen bonding layer 3. In addition, herein, the contact with the entire surface means uniform contact with the entire surface in a dispersed state instead of contacting with all positions of the entire surface.

The second conductive gas diffusion structure 5 is formed by a material having higher conductivity than that of the hydrogen bonding layer 3. The entire hydrogen bonding layer 3 can be electrified via the second conductive gas diffusion structure 5.

In addition, the second conductive gas diffusion structure 5 is formed to discharge the hydrogen gas diffused in the gas passage direction as a direction perpendicular to the direction of the hydrogen bonding layer 3.

Further, since it is necessary to efficiently collect the hydrogen gas penetrating the cation exchange membrane 1 in the one side of entire surface of the hydrogen bonding layer 3, it is desirable that the second conductive gas diffusion structure 5 adopts the configuration of assisting the gas diffusion as in the first conductive gas diffusion structure 4.

The interconnection layer 6 is a metal layer which electrically connects the first conductive gas diffusion structure 4 and the second conductive gas diffusion structure 5 to the power supply device 7, and is installed in each of the first conductive gas diffusion structure 4 and the second conductive gas diffusion structure 5. In addition, the interconnection layer 6 installed in the first conductive gas diffusion structure 4 is bonded to the surface opposite of the surface contacting with the hydrogen dissociation layer 2 of the first conductive gas diffusion structure 4. Further, the interconnection layer 6 installed in the second conductive gas diffusion structure 5 is bonded to the surface opposite of the surface contacting with the hydrogen bonding layer 3 of the second conductive gas diffusion structure 5.

The power supply device 7 is a device which supplies power to the hydrogen dissociation layer 2 and the hydrogen bonding layer 3 while being electrically connected to the hydrogen dissociation layer 2 via the interconnection layer 6 and the first conductive gas diffusion structure 4 and electrically connected to the hydrogen bonding layer 3 via the interconnection layer 6 and the second conductive gas diffusion structure 5. The power supply device 7 supplies power so that the hydrogen dissociation layer 2 becomes an anode and the hydrogen bonding layer 3 becomes a cathode.

In addition, the voltage and the current during the electrification of the power supply device 7 may be arbitrarily controlled. That is, the power supply device 7 is able to arbitrarily control a difference in potential between the hydrogen dissociation layer 2 and the hydrogen bonding layer 3, and to further arbitrarily control an amount (current amount) of electrons supplied to the hydrogen bonding layer 3.

Likewise, the power supply device 7 has a voltage application portion and an electron supply amount control portion. The voltage application portion applies a voltage to the cation exchange membrane 1 by setting the hydrogen dissociation layer 2 as an anode and setting the hydrogen bonding layer 3 as a cathode. The electron supply amount control portion controls an amount (current amount) of electrons supplied to the hydrogen bonding layer 3.

The heater 8 is used to heat a space where the cation exchange membrane 1 is exposed, and in the embodiment, heats the entire space where the cation exchange membrane 1, the hydrogen dissociation layer 2, the hydrogen bonding layer 3, the first conductive gas diffusion structure 4, the second conductive gas diffusion structure 5, and the interconnection layer 6 are exposed. In addition, the heater 8 is supported by a support body (not shown).

Next, the operation of the hydrogen supply device S1 of the present embodiment with such a configuration will be described.

First, a voltage is applied by the power supply device 7 so that the hydrogen dissociation layer 2 becomes anode, and the hydrogen bonding layer 3 becomes a cathode. When a voltage is applied in this way, an electrical potential of one side of the cation exchange membrane 1 becomes higher than that of the other side, and an electrical potential of the other side thereof becomes lower than the one side, thereby forming a gradation of a voltage. In addition, herein, the potential difference and/or the current amount between the hydrogen dissociation layer 2 and the hydrogen bonding layer 3 are uniformly maintained by the power supply device 7.

Likewise, in the state where power is supplied by the power supply device 7, a mixed gas G1 (hydrogen containing gas) containing hydrogen is supplied from the outside to one side in the gas passage direction. The mixed gas G1 flows into the first conductive gas diffusion structure 4, and contacts a surface of one side the hydrogen dissociation layer 2.

In addition, in the embodiment, the mixed gas G1 includes nitrogen and carbon dioxide in addition to hydrogen.

When the mixed gas G1 contacts with the surface of one side of the hydrogen dissociation layer 2, hydrogen (hydrogen molecules) contained in the mixed gas G1 is dissociated and changed into hydrogen ions by a catalytic reaction of the hydrogen dissociation layer 2, and the hydrogen ions are diffused inside of the hydrogen dissociation layer 2.

Here, in the hydrogen supply device S1 of the embodiment, the first conductive gas diffusion structure 4 is formed so that the passing gas is dispersed and uniformly contacted with the entire surface of one side of the hydrogen dissociation layer 2. As a result, since the mixed gas G1 uniformly contacts the entire surface of one side of the hydrogen dissociation layer 2 in a dispersed state, it is possible to efficiently dissociate hydrogen in the entire hydrogen dissociation layer 2.

The hydrogen ions diffused in the inside of the hydrogen dissociation layer 2 arrives at the cation exchange membrane 1. Here, a voltage is applied to the cation exchange membrane 1 so that the hydrogen dissociation layer 2 has a relatively high potential, and the hydrogen bonding layer 3 has a relatively low potential. For this reason, the hydrogen ions arriving at the cation exchange membrane 1 permeate the cation exchange membrane from the hydrogen dissociation layer 2 to the hydrogen bonding layer 3 by the gradation of the voltage.

The hydrogen ions penetrating the cation exchange membrane 1 from the hydrogen dissociation layer 2 to the hydrogen bonding layer 3 arrive at the hydrogen bonding layer 3, and are diffused inside of the hydrogen bonding layer 3.

A voltage is applied by the power supply device 7 so that the hydrogen bonding layer 3 becomes a cathode. That is, electrons are supplied from the power supply device 7 to the hydrogen bonding layer 3 via the interconnection layer 6 and the second conductive gas diffusion structure 5. For this reason, the hydrogen ions diffused inside of the hydrogen bonding layer 3 are bonded to each other by the electrons, and are discharged from one surface (the surface on the second conductive gas diffusion structure 5 side) of the hydrogen bonding layer 3 in the form of hydrogen molecules.

As a result, hydrogen gas G2 is discharged from the second conductive gas diffusion structure 5, thereby obtaining the hydrogen gas G2 which is refined by the hydrogen supply device of the embodiment.

In addition, the mixed gas G1 supplied to the first conductive gas diffusion structure 4 from one side in the gas passage direction is discharged from the other side in the gas passage direction in the form of exhaust gas G3, of which the concentration of hydrogen is reduced, after the hydrogen is absorbed by the hydrogen dissociation layer 2.

Likewise, according to the hydrogen supply device S1 of the embodiment, the hydrogen contained in the mixed gas G1 supplied to the anode side is dissociated into the hydrogen ions by the hydrogen dissociation layer 2, the hydrogen ions permeate the cation exchange membrane 1 by the gradation of the voltage, the hydrogen ions are bonded to each other using electrons in the hydrogen bonding layer 3 to be changed into hydrogen, and then the hydrogen gas G2 is discharged from the cathode side.

According to the hydrogen supply device S1 of the embodiment, the gradation of the voltage is formed between the mixed gas side and the hydrogen supply side, and the permeation of the hydrogen is performed by the gradation of the voltage. For this reason, the gradation of the pressure is not necessary between the mixed gas side and the hydrogen supply side, and a large device such as a pump does not need to be installed. Further, the hydrogen supply device S1 of the embodiment does not include a mechanical operating part.

Therefore, according to the hydrogen supply device S1 of the embodiment, it is possible to dissociate hydrogen from the mixed gas G1, and to suppress noise during the operation of the device.

In addition, in the hydrogen bonding layer 3, two electrons are required to bond two hydrogen ions. That is, when two electrons are supplied to the hydrogen bonding layer 3, one hydrogen molecule can be obtained. For this reason, when the amount (i.e., the current amount) of electrons supplied to the hydrogen bonding layer 3 is controlled, it is possible to control the amount of hydrogen discharged from the hydrogen bonding layer 3.

In addition, in the hydrogen supply device S1 of the embodiment, since the power supply device 7 is able to control the amount of electrons supplied to the hydrogen bonding layer 3 as described above, it is possible to arbitrarily control the supply amount of the hydrogen gas G2.

Further, since the value of the current amount can be highly precisely controlled by known technology, according to the hydrogen supply device S1 of the embodiment, it is possible to highly precisely control the supply amount of the hydrogen gas G2. In principle, it is possible to control the supply amount of the hydrogen gas G2 by the unit of one hydrogen molecule.

Furthermore, when the amount of electrons supplied to the hydrogen bonding layer 3 is set to zero (i.e., a zero potential difference), it is possible to control the supply amount of the hydrogen gas G2 to be zero while supplying the mixed gas G1.

In addition, in the conventional hydrogen supply device, in the case where the hydrogen partial pressure was low, hydrogen could not be efficiently dissociated even when the pressure of the mixed gas was made to be high. In the case where a gas such as a biogas or a reformed gas having a low concentration of hydrogen was used, hydrogen gas could not be efficiently obtained. On the contrary, in the hydrogen gas supply device S1 of the embodiment, the production amount (hydrogen permeation amount) of hydrogen molecules is dependent on the amount of electrons supplied to the hydrogen bonding layer 3. Accordingly, even when the concentration of hydrogen of the mixed gas G1 is low, it is possible to efficiently dissociate hydrogen from the mixed gas G1 having a low concentration of hydrogen by increasing the current amount or the electrical potential.

In addition, in the hydrogen supply device S1 of the embodiment, it is possible to precisely and promptly control the supply amount of the hydrogen gas G1 to be an arbitrary value including zero by controlling the current amount. For this reason, in the case where the hydrogen gas is supplied instead of the mixed gas G1, the hydrogen supply device S1 of the embodiment can be used as a precise hydrogen supply device or a hydrogen valve capable of precisely and promptly controlling the supply amount of the hydrogen gas.

Further, in the hydrogen supply device S1 of the embodiment, the concentration of the hydrogen gas obtained by the above-described current amount or potential difference is not changed. For this reason, in the case where a variation in the supply amount of the hydrogen is permitted by the unit of time, a variation in the current amount or the potential difference is permitted.

For this reason, for example, an electrical power generating device such as a wind power generating device having a variation in the current amount or the potential difference may be used as a power supply device. That is, according to the power supply device S1 of the embodiment, it is possible to obtain hydrogen gas from low-quality electrical power.

In addition, it is possible to obtain high-quality electrical power from a fuel cell or the like by using the hydrogen gas obtained by the hydrogen supply device S1 of the embodiment as fuel. For this reason, the hydrogen supply device S1 of the embodiment may be used as a conversion device which converts low-quality electrical power into high-quality electrical power.

Further, in the cation exchange membrane 1, the permeability of hydrogen ions changes in proportion to its exposed temperature within a predetermined range. For this reason, in the hydrogen supply device S1 of the embodiment, the cation exchange membrane 1 is heated by the heater 8 so that the cation exchange membrane 1 has desired permeability with respect to hydrogen ions.

Second Embodiment

Next, a second embodiment of the present invention will be described. In addition, in the embodiment, the description of the same part as the first embodiment will be omitted or simplified.

Figure 5:
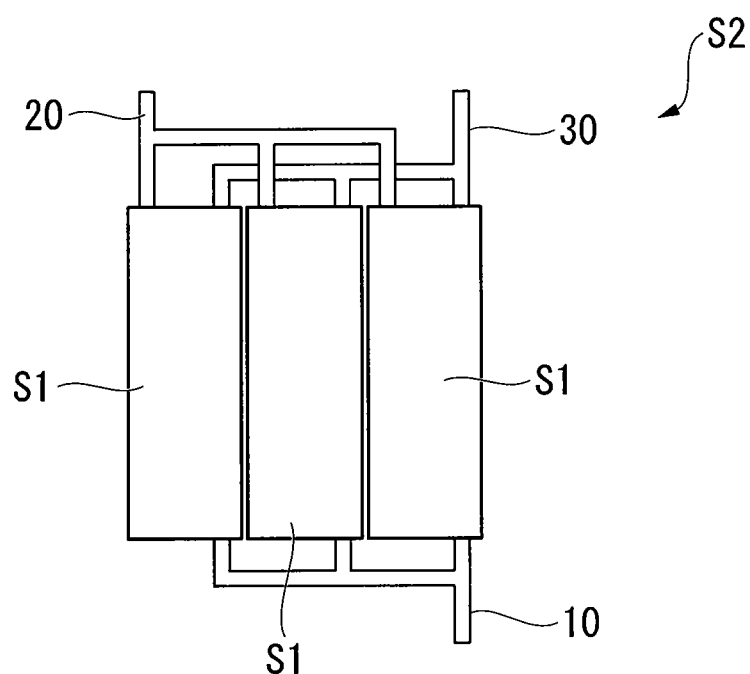
FIG. 5 is a schematic diagram illustrating a schematic configuration of a hydrogen supply device according to a second embodiment of the present invention.

FIG. 5 is a schematic diagram showing a schematic configuration of a hydrogen supply device S2 of the embodiment. As shown in the drawing, the hydrogen supply device S2 of the embodiment includes a plurality of units S1, where one unit corresponds to one hydrogen supply device S1 of the first embodiment. In addition, in the hydrogen supply device S2 of the embodiment, the plurality of units S1 is arranged in the lamination direction (a direction perpendicular to the gas passage direction) of the cation exchange membrane 1, the hydrogen dissociation layer 2, and the hydrogen bonding layer 3.

According to the hydrogen supply device S2 of the embodiment with such a configuration, since the hydrogen supply device is formed by the plurality of units S1, it is possible to improve the hydrogen supply amount of the device without increasing the size of the unit of, for example, the cation exchange membrane 1, the hydrogen dissociation layer 2, and the hydrogen bonding layer 3.

In addition, according to the hydrogen supply device S2 of the embodiment, since the plurality of units S1 is arranged in the lamination direction (the direction perpendicular to the gas passage direction) of the cation exchange membrane 1, the hydrogen dissociation layer 2, and the hydrogen bonding layer 3, it is possible to improve the hydrogen supply amount of the device without increasing the installation area of the device.

In addition, the mixed gas G1 is supplied to the respective units S1 via a common pipe 10. In addition, the high-purity gas G2 discharged from the respective units S1 is collected via a common pipe 20 connected to the respective units S1, and then is discharged. Then, the exhaust gas G3 is collected via a common pipe 30 connected to the units S1, and then is discharged.

Further, although the power supply device 7 and the heater 8 are not shown in FIG. 5, the power supply device 7 and the heater 8 may be installed for each of the unitary units, or one power supply device 7 and one heater 8 may be installed for all the unitary units S1.

While the preferred embodiments of the present invention have been described with reference to the drawings, the present invention is not limited to the above-described embodiments. All the shapes, combinations, and the like of the respective constituents shown in the above-described embodiments are examples, and may be modified into various forms based on the design requirement and the like within the scope without departing from the concept of the present invention.

For example, in the above-described embodiment, the configuration has been described in which the cation exchange membrane 1 is used as the hydrogen permeation layer of the present invention. However, the present invention is not limited thereto, but an ion exchange membrane obtained by alternately laminating a cation exchange membrane and an anion exchange membrane may be used.

Example

Subsequently, the result of the test performed on the hydrogen supply device S1 of the first embodiment will be described with reference to FIGS. 6 and 7.

Figure 6:
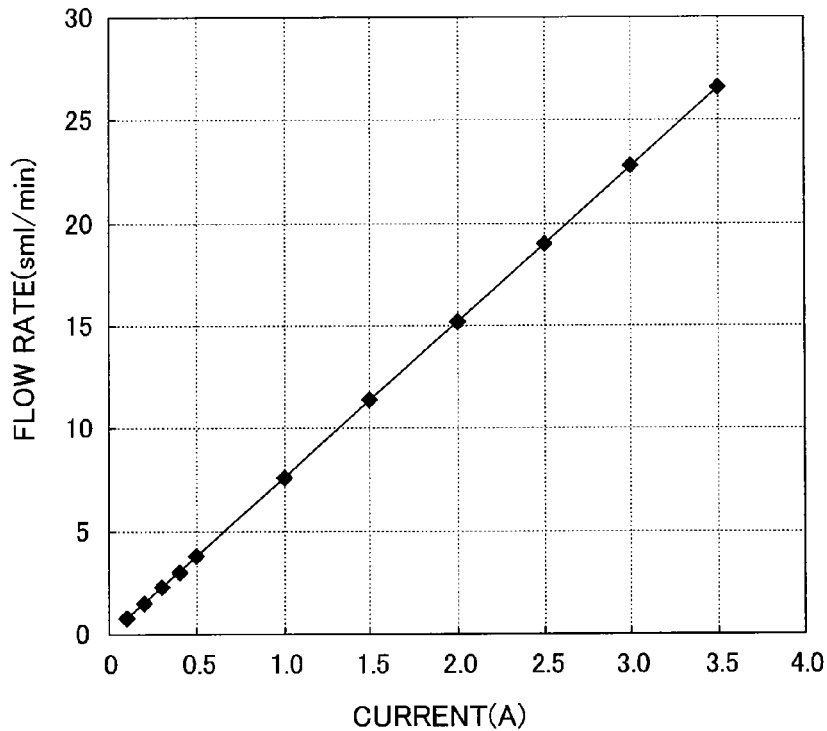
FIG. 6 is a table showing a test result of the hydrogen supply device according to the first embodiment of the present invention.

FIG. 6 is a graph showing a relationship between the current value and the flow rate of the hydrogen gas in the hydrogen supply device S1 of the first embodiment. In addition, in the test for obtaining data shown in FIG. 6, the current value was changed within 3.5 A in the condition that the area of the cation exchange membrane 1 was set to 25 $cm^2$, the potential difference was set to 0.1 V, and the heating temperature of the cation exchange membrane 1 was set to 60° C. In addition, in the test, a gas containing 54.44% of hydrogen, 22.94% of nitrogen, and 22.62% of carbon dioxide was used as the mixed gas G1, and the mixed gas G1 was supplied to the hydrogen supply device S1 at the flow rate of 48.73 ml/min.

As a result, as shown in FIG. 6, the supply amount of the mixed gas G1 was changed linearly with respect to a variation in the current value.

Accordingly, according to the test, in the hydrogen supply device S1 of the first embodiment, it was found that the supply amount of the hydrogen gas could be controlled in proportion to the current value.

Figure 7:
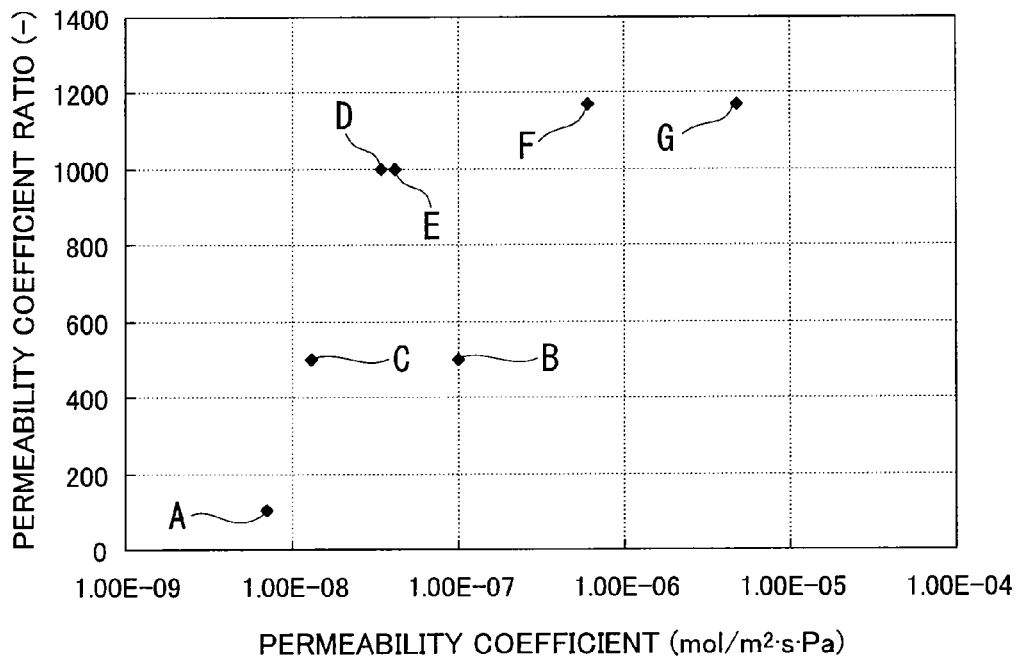
FIG. 7 is a table showing a test result of the hydrogen supply device according to the first embodiment of the present invention.

FIG. 7 is a table comparing the hydrogen permeability coefficient of the existing hydrogen supply device with the hydrogen permeability coefficient of the hydrogen supply device S1 of the first embodiment, where the horizontal axis indicates the permeability coefficient, and the vertical axis indicates the permeability coefficient ratio. In addition, the permeability coefficient ratio is a value indicating a ratio between hydrogen and impure gas contained in the supplied mixed gas.

In addition, in FIG. 7, the point A indicates the test value of the existing hydrogen supply device having an SiC-based hydrogen dissociation layer, the point B indicates the test value of the existing hydrogen supply device having an Si—Ni—O membrane, the point C indicates the test value of the existing hydrogen supply device having amorphous silica, the points D and E indicate the test values of the existing hydrogen supply device having a palladium-based hydrogen permeation layer, the point F indicates the test value of the hydrogen supply device S1 of the first embodiment in the case where the current value is 3.3 A in the test condition of FIG. 6, and the point G indicates the test value of the hydrogen supply device S1 of the first embodiment in the case where the current value is 25 A in the test condition of FIG. 6.

In addition, as is understood from FIG. 7, according to the hydrogen supply device S1 of the first embodiment, the test result shows that the permeability coefficient and the permeability coefficient ratio are better than those of the existing hydrogen supply device.

Accordingly, according to the test, it is found that the hydrogen supply device S1 of the first embodiment is able to more efficiently supply the hydrogen than the existing hydrogen supply device.

INDUSTRIAL APPLICABILITY

According to the present invention, it is possible to provide a hydrogen supply device capable of dissociating hydrogen from a hydrogen containing gas even when the concentration of hydrogen is low and suppressing noise during the operation of the device.

The invention claimed is:

1. A hydrogen supply device which supplies hydrogen by selectively permitting permeation of hydrogen contained in a hydrogen containing gas, the hydrogen supply device comprising:
   a first metal layer which dissociates hydrogen molecules into hydrogen ions by a catalytic reaction and has hydrogen permeability;
   a second metal layer which creates hydrogen molecules by bonding hydrogen ions to each other using electrons and has hydrogen permeability;
   a hydrogen permeation layer which is interposed between the first and second metal layers, the hydrogen permeation layer enabling permeation of the hydrogen ions from the first metal layer to the second metal layer by the application of a voltage;
   the first metal layer including a contact surface contacting the hydrogen permeation layer;
   the second metal layer including a contact surface contacting the hydrogen permeation layer;
   a first electrically-conductive gas diffusion portion which contacts a plurality of parts of a first surface opposite to the contact surface of the first metal layer, and is configured to diffuse the hydrogen containing gas at other parts of the first surface exposed between the plurality of parts of the first surface of the first metal layer;
   a second electrically-conductive gas diffusion portion which contacts a plurality of parts of a second surface opposite to the contact surface of the second metal layer, and is configured to enable generated hydrogen gas to flow at other parts of the second surface exposed between the plurality of parts of the second surface of the second metal layer;
   a first interconnection layer connected to a surface opposite to a surface of the first gas diffusion portion contacting the first metal layer;
   a second interconnection layer connected to a surface opposite to a surface of the second gas diffusion portion contacting the second metal layer; and
   a voltage application portion electrically connected to the first and second interconnection layers, and configured to apply the voltage to the hydrogen permeation layer by setting the first metal layer as an anode and setting the second metal layer as a cathode.

2. The hydrogen supply device according to claim 1, further comprising:
   an electron supply amount control portion positioned and configured to control an amount of electrons supplied to the second metal layer.

3. The hydrogen supply device according to claim 1, wherein at least one of the first and second gas diffusion portions has a structure that comprises a member of a group consisting of:
   a groove, a structure formed of sintered metal, and a structure formed of a grating-shaped metal plate or a lamination thereof.

4. The hydrogen supply device according to claim 1, further comprising:
   a heating portion positioned and configured to heat a space where the hydrogen permeation layer is exposed.

5. The hydrogen supply device according to claim 1, further comprising:
   a plurality of units, each unit including the first metal layer, the second metal layer, and the hydrogen permeation layer.

6. The hydrogen supply device according to claim 5, wherein the plurality of units is arranged in the lamination direction of the first metal layer, the second metal layer, and the hydrogen permeation layer.

7. The hydrogen supply device according to claim 2, wherein the electron supply amount control portion is configured to control an amount of generated hydrogen molecules by controlling the amount of electrons supplied to the second metal layer based on an electric current value in the hydrogen supply device.

8. The hydrogen supply device according to claim 1, wherein the first and second interconnection layers are metal layers.

* * * * *

UNITED STATES PATENT AND TRADEMARK OFFICE
CERTIFICATE OF CORRECTION

PATENT NO. : 8,496,736 B2
APPLICATION NO. : 12/867899
DATED : July 30, 2013
INVENTOR(S) : Nishino et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

Signed and Sealed this
Fifteenth Day of September, 2015

Michelle K. Lee
*Director of the United States Patent and Trademark Office*